(12) United States Patent
Ahn et al.

(10) Patent No.: US 11,162,399 B2
(45) Date of Patent: Nov. 2, 2021

(54) VEHICLE AND METHOD FOR CONTROLLING THE SAME

(71) Applicants: Hyundai Motor Company, Seoul (KR); Kia Motors Corporation, Seoul (KR)

(72) Inventors: Sunghyun Ahn, Goyang-si (KR); Haksung Lee, Hwaseong-si (KR); Yeonho Kim, Suwon-si (KR); Jong Hyun Kim, Yongin-si (KR)

(73) Assignees: Hyundai Motor Company, San Francisco (KR); Kia Motors Corporation, Seoul (KR)

( * ) Notice: Subject to any disclaimer, the term of this patent is extended or adjusted under 35 U.S.C. 154(b) by 335 days.

(21) Appl. No.: 16/380,030

(22) Filed: Apr. 10, 2019

(65) Prior Publication Data
US 2020/0131954 A1 Apr. 30, 2020

(30) Foreign Application Priority Data
Oct. 24, 2018 (KR) .................. 10-2018-0127576

(51) Int. Cl.
*F01M 1/22* (2006.01)
*F01M 1/02* (2006.01)
(Continued)

(52) U.S. Cl.
CPC ............... *F01M 1/02* (2013.01); *B60L 15/20* (2013.01); *B60L 50/60* (2019.02); *B60L 53/24* (2019.02);
(Continued)

(58) Field of Classification Search
CPC .... F01M 1/02; F01M 2001/0215; F01M 5/00; F01M 11/04; F01M 5/001; F01M 5/002;
(Continued)

(56) References Cited

U.S. PATENT DOCUMENTS 7,932,633 B2 * 4/2011 King ............... B60L 15/007 307/45
10,115,990 B2 * 10/2018 Kakeno ............ H01M 16/006
(Continued)

FOREIGN PATENT DOCUMENTS

JP 2005-214216 A 8/2005
JP 2012-057645 A 3/2012
(Continued)

*Primary Examiner* — Jonathan M Dager
*Assistant Examiner* — Jean W Charleston
(74) *Attorney, Agent, or Firm* — Morgan, Lewis & Bockius LLP

(57) ABSTRACT

A vehicle may include a driving motor supplying driving force to vehicle wheel; a power converter using a coil provided in the driving motor to transform power input from the external power source; a battery charged according to counter electromotive force of the driving motor in a regenerative braking mode, charged according to the power transformed by the power converter in a charging mode, and supplying driving power to the driving motor in a driving mode; an oil pump supplying oil to the driving motor; a detector detecting temperature of the oil; and a controller controlling the oil pump to be operated in a warm-up mode when the oil temperature detected by the detector is less than a first threshold temperature and the battery is in the charging mode, and applying reference power to the oil pump to move the oil to the driving motor in the warm-up mode.

17 Claims, 5 Drawing Sheets

(51) Int. Cl.
  *B60L 15/20* (2006.01)
  *F01M 11/04* (2006.01)
  *F01M 5/00* (2006.01)
  *B60L 53/24* (2019.01)
  *B60L 50/60* (2019.01)

(52) U.S. Cl.
  CPC ............ *F01M 5/001* (2013.01); *F01M 5/002* (2013.01); *F01M 11/04* (2013.01); *B60L 2210/10* (2013.01); *B60L 2210/30* (2013.01); *B60L 2210/40* (2013.01); *B60L 2240/36* (2013.01); *F01M 2250/60* (2013.01)

(58) Field of Classification Search
  CPC ..... F01M 2250/60; B60L 15/20; B60L 53/24; B60L 50/60; B60L 2210/10; B60L 2240/36; B60L 2210/40; B60L 2210/30; B60L 2240/425; B60L 2240/54; B60L 2240/12; B60L 2240/421; B60L 1/003; B60L 50/52; F04B 49/065; F16H 57/0436; H02K 9/00; B60Y 2200/91; Y02T 90/12; Y02T 10/64; Y02T 90/14; Y02T 10/7072; Y02T 10/70; Y02T 10/72
  USPC .......................................................... 701/22
  See application file for complete search history.

(56) References Cited

U.S. PATENT DOCUMENTS

| | | | | |
|---|---|---|---|---|
| 2010/0096926 | A1* | 4/2010 | King | B60L 53/24 307/45 |
| 2011/0166727 | A1* | 7/2011 | Light | F16H 57/0441 701/22 |
| 2015/0367746 | A1* | 12/2015 | Maeno | B60L 53/14 701/22 |
| 2016/0049819 | A1* | 2/2016 | Butler | H02J 7/0068 320/105 |
| 2016/0211790 | A1* | 7/2016 | Ajima | H02P 27/08 |
| 2017/0268662 | A1 | 9/2017 | Song et al. | |

FOREIGN PATENT DOCUMENTS

| | | | |
|---|---|---|---|
| JP | 2012-197715 A | | 10/2012 |
| JP | 2014-020451 A | | 2/2014 |
| JP | 2016-201959 A | | 12/2016 |
| KR | 10-1724750 B1 | | 4/2017 |
| KR | 1020190097425 A | * | 8/2018 |
| KR | 10-2019-0097425 A | | 8/2019 |

* cited by examiner

VEHICLE AND METHOD FOR CONTROLLING THE SAME

CROSS-REFERENCE TO RELATED APPLICATION

The present application claims priority to Korean Patent Application No. 10-2018-0127576 filed on Oct. 24, 2018, the entire contents of which is incorporated herein for all purposes by this reference.

BACKGROUND OF THE INVENTION

Field of the Invention

The present invention relates to a vehicle and method for controlling the same, which controls a rise in oil temperature in an oil pump.

Discussion of Related Art

Vehicles are machines running on the road by driving their wheels and provided with various devices for protecting people on board, assisting in driving and giving smooth rides.

The vehicles include motor vehicles (conventional engine-driven cars) driven with mechanical power produced by burning oil fuel, such as gasoline and diesel, and eco-friendly vehicles driven by electrical power to reduce the amount of harmful fuel emissions and increase fuel efficiency.

The eco-friendly vehicles include electric vehicles having a rechargeable power unit comprised of a battery and a driving motor, rotating the driving motor with electricity charged in the battery, driving the wheels using the rotation of the driving motor, hybrid vehicles having an engine, a battery, and a driving motor and driven by controlling mechanical power of the engine and electrical power of the driving motor, and hydrogen fuel cell vehicles.

Among them, the electric vehicle is provided with an oil pump to provide lubrication for the speed reducer. The oil pump of the speed reducer is controlled according to the temperature of the driving motor.

Oil in the oil pump is mainly used to lubricate the speed reducer and cool down the driving motor, and the temperature of the oil has a great influence on the fuel efficiency of the vehicle. For example, if the oil temperature is low, the viscosity of the oil rises, which lowers efficiency of the speed reducer. The decline in efficiency of the speed reducer leads to the decrease in fuel efficiency of the vehicle.

Accordingly, a warmer to raise the oil temperature or an oil pump having a motor to generate torque stronger than the oil viscosity is used recently.

In the case of using an extra device such as the warmer to increase the oil temperature in the oil pump, it incurs an expense of the device and the layout of the vehicle gets more complicated.

In the latter case of using the motor that generates significant torque, the motor may have the larger volume than before, which leads to an increase in size and expense of the oil pump.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and method for controlling the same, which performs a warm-up mode when oil temperature of the oil pump is below a threshold temperature and the vehicle is operating in a charging state and controls the oil pump to be operated in a normal mode after completion of the warm-up mode.

Various aspects of the present invention are directed to providing a vehicle and method for controlling the same, which drops the temperature of a driving motor during the warm-up mode and applies oil that receives heat from the driving motor to the oil pump.

In accordance with an aspect of the present invention, a vehicle may include a driving motor connected to a vehicle wheel and configured to supply driving force to the vehicle wheel; a power converter connected to an external power source and configured to use a coil provided in the driving motor to transform power input from the external power source; a battery configured to be charged according to counter electromotive force of the driving motor in a regenerative braking mode, charged according to the power transformed by the power converter in a charging mode, and supply driving power to the driving motor in a driving mode; an oil pump configured to supply oil to the driving motor; a detector configured to detect temperature of the oil; and a controller configured to control the oil pump to be operated in a warm-up mode when the oil temperature detected by the detector is less than a first threshold temperature and the battery is in the charging mode, and apply reference power to the oil pump to move the oil to the driving motor in the warm-up mode.

The oil pump may include a pump motor configured to pump oil stored in an oil reservoir.

The reference power may be power for the pump motor to be rotated at less than reference speed.

The controller may switch operation of the oil pump to be in a normal mode when the oil temperature detected in the warm-up mode is higher than a second threshold temperature, and in the normal mode, control rotation speed of the pump motor.

The detector may further detect temperature of the driving motor. The controller may be configured to control the rotation speed of the pump motor based on the detected temperature of the driving motor and the detected oil temperature.

The vehicle may further include a speed reducer disposed between the vehicle wheel and the driving motor. The oil pump may pump the oil stored in the oil reservoir to supply the oil to the speed reducer in the normal mode.

The vehicle may further include an oil path disposed between the driving motor and the oil pump, and an oil cooler accommodating a portion of the oil path and a coolant path in which a coolant flows. The controller may be configured to control operation of the oil cooler such that the coolant flows into the coolant path when the temperature of the driving motor is higher than a certain temperature.

The vehicle may further include a housing accommodating the driving motor, a first fluid path disposed in the housing, connected to the oil path and configured to spray oil that flows into through the oil path, and a second fluid path configured to collect the sprayed oil and release the collected oil to the oil reservoir.

The vehicle may further include a first driver configured to output driving power corresponding to a target driving speed to the driving motor in the driving mode; and a second driver configured to output driving power corresponding to the rotation speed of the oil pump to the oil pump in a normal mode of the oil pump.

The vehicle may further include a booster configured to boost Alternate Current (AC) power input from an external power source to a certain extent; a first converter configured to convert the boosted power to power required for charging the battery; and a first rectifier configured to rectify the power converted by the first converter and apply the rectified power to the battery.

The vehicle may further include an auxiliary battery; a second converter configured to convert power of the battery to power required for charging the auxiliary battery; and a second rectifier configured to rectify the power converted by the second converter and apply the rectified power to the auxiliary battery.

The vehicle may further include a third converter configured to rectify the AC power input from the external power source, convert the rectified AC power to a high frequency AC voltage, and apply the high frequency AC voltage to a coil of the driving motor; and a third rectifier configured to rectify power transformed by the coil of the driving motor and apply the rectified power to the battery.

In accordance with another aspect of the present invention, a method for controlling the vehicle having a driving motor configured to apply driving force to a vehicle wheel and a battery configured to supply power to the driving motor may include detecting temperature of oil stored in an oil reservoir; determining whether the vehicle is operated in a charging mode when the detected oil temperature is lower than a first threshold temperature; operating an oil pump in a warm-up mode when the vehicle is operated in the charging mode; checking temperature of the oil during the warm-up mode of the oil pump; and operating the oil pump in a normal mode when the checked oil temperature is higher than a second threshold temperature, wherein the operating of the oil pump in the warm-up mode may include applying reference power to the oil pump such that the oil is moved to the driving motor.

Determination of whether the vehicle is operated in the charging mode may include using a coil provided in the driving motor to transform power input from an external power source; and determining whether the transformed power is applied to the battery.

The operating of the oil pump in the warm-up mode may include having a pump motor provided in the oil pump rotated at less than a threshold speed.

The operating of the oil pump in the normal mode may include controlling rotation speed of a pump motor provided in the oil pump.

The controlling of the rotation speed of a pump motor may include detecting temperature of the driving motor; and controlling the rotation speed of the pump motor based on the detected temperature of the driving motor and the detected oil temperature.

The operating of the oil pump in the normal mode may include regulating driving power applied to the pump motor to control rotation speed of the pump motor based on actual rotation speed and target rotation speed of the oil pump.

The operating of the oil pump in the normal mode may include pumping oil stored in an oil reservoir by controlling rotation speed of the pump motor; and supplying the pumped oil to a speed reducer and the driving motor.

The operating of the oil pump in the normal mode may include controlling operation of an oil cooler such that a coolant flows into a coolant path when the detected temperature of the driving motor is higher than a certain temperature.

The method may further include regulating driving power applied to the driving motor to control rotation speed of the driving motor based on target driving speed and actual driving speed, when the vehicle is operated in a driving mode.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
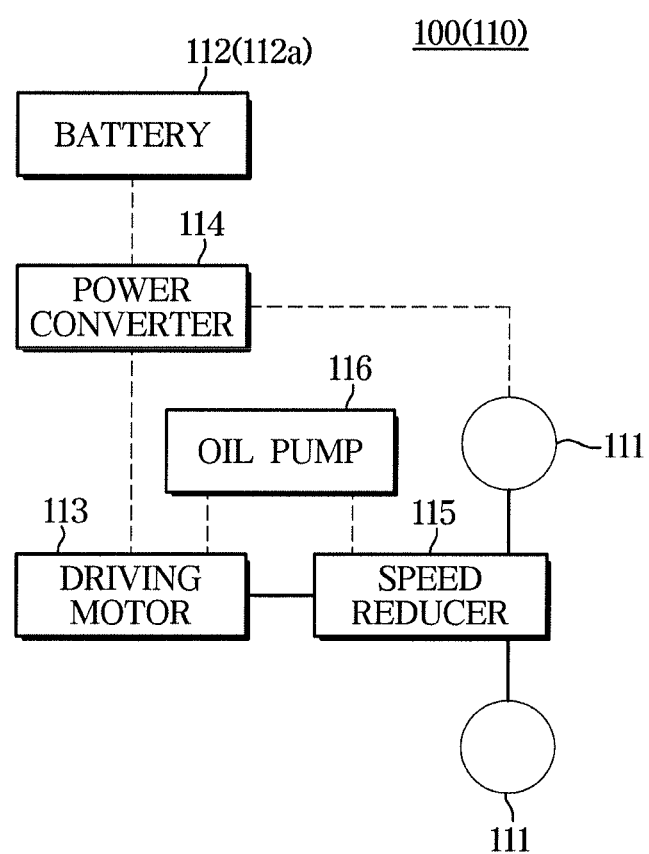
FIG. 1 is a block diagram of a power system of a vehicle, according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the other hand, the present invention(s) is/are intended to cover not only the exemplary embodiments, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~ part", "~ unit", "~ module", "~ member", "~ block", etc., may be implemented in software and/or hardware, and a plurality of "~ parts", "~ units", "~ modules", "~ members", or "~ blocks" may be implemented in a single element, or a single "~ part", "~ unit", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

Figure 2:
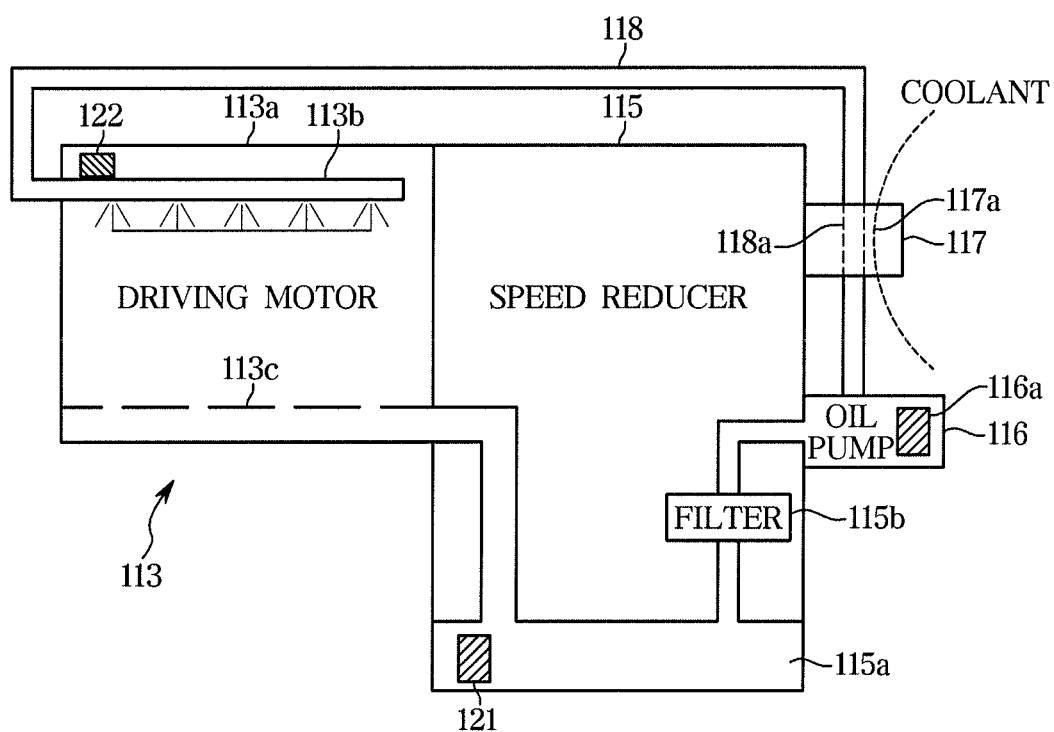
FIG. 2 is a detailed block diagram of an oil pump provided in a vehicle, according to an exemplary embodiment of the present invention.

FIG. 1 is a block diagram of a power system of a vehicle, according to an exemplary embodiment of the present invention, and FIG. 2 is a detailed block diagram of an oil pump provided in a vehicle, according to an exemplary embodiment of the present invention.

A vehicle in accordance with the exemplary embodiment may include an eco-friendly vehicle, which receives power from a charger provided in a parking lot or charging station to charge a battery.

An electric vehicle will be taken herein as an example of the eco-friendly vehicle.

A vehicle 100 includes a vehicle body with external and internal portions, and remaining portion, i.e., a chassis 110, on which vehicle wheels 111 and mechanical devices required for driving are disposed.

On the external of the vehicle body, a charging port may be provided, in which a plug of an external charger may be inserted.

The charging port may include a charging terminal for slow charging and a charging terminal for quick charging.

Alternatively, the charging port may include a single charging terminal. In the instant case, the vehicle 100 may switch conversion configurations of external power in a response to the slow charging mode or quick charging mode input through an input device.

The chassis 110 of the vehicle 100 is a frame to support the vehicle body, including the vehicle wheels 111 provided at front, back, left and right sides of the vehicle 100, a power system 112 to 116 to apply driving power to the vehicle wheels 111, a steering system, a braking system for applying braking power to the vehicle wheels 111, and a suspension system.

The power system may generate driving power to drive the vehicle 100 and control the driving power, and include a power generator and a power transfer device.

Referring to FIG. 1, the power generator may include a battery 112, a driving motor 113, and a power converter 114, and the power transfer device may include a speed reducer 115 (see FIG. 2).

The battery 112 is charged by receiving power from an external power source plugged into the charging port in a charging mode, and charged by receiving power applied from the driving motor 113 and supplies the charged power to the driving motor 113 in a regenerative braking mode.

It is also possible for the battery 112 to supply power to various devices such as convenience devices and extra devices provided in the vehicle 100.

The vehicle 100 may further include a second battery to supply power to the various devices provided in the vehicle 100.

The battery to supply power to the driving motor 113 may correspond to a first battery.

For example, the vehicle 100 may include a first battery 112a (see FIG. 4) for supplying driving power of a high voltage current to the power system including the driving motor 113, and a second battery 112b (see FIG. 4) for supplying driving power to an electronic device such as a convenience device and an extra device.

The convenience device as herein used may include an audio device, interior lamps, an audio video navigation (AVN).

An output voltage of the first battery 112a may be equal to or greater than an output voltage of the second battery 112b. The second battery 112b is charged with a low voltage current and applies driving power of the low voltage current to the various electronic devices.

The first battery 112a is charged by receiving power from an external power source plugged into the charging port. The external power source may be a charger provided in a parking lot or charging station.

It is also possible for the first battery 112a to be charged by receiving power supplied from the driving motor 113. When the vehicle 100 is operated in the regenerative braking mode, the first battery 112a may be charged using a current from the counter electromotive force generated by the driving motor 113.

The power of an external power source applied to the first battery 112a may be one whose voltage is boosted by the power converter 114 or one whose voltage is transformed in the coil of the driving motor 113.

When the vehicle is operated in a charging mode, the first battery 112a may be charged using the power boosted and applied by the power converter 114 or using the power transformed and applied by the coil of the driving motor 113.

The second battery 112b may be charged using the power of the first battery 112a or using the power of an external power source. The second battery 112b may be an auxiliary battery.

The power of the first battery 112a or power of the external power source may be converted by the power converter 114 and then applied to the second battery 112b to charge the second battery 112b.

The driving motor 113 generates driving force to turn the vehicle wheels 111 and transmits the driving force to the speed reducer 115.

The driving motor 113 performs the regenerative braking mode in an energy regeneration condition from braking, speed reduction or slow driving, so that it is operated as a generator according to the rotation force transmitted through the vehicle wheels 111 to charge the first battery 112a.

When the vehicle 100 is operated in the charging mode, the driving motor is operated as a transformer to transform the power applied from an external power source and apply the transformed power to the first battery 112a to charge the first battery 112a.

The driving motor 113 may include a circular stator and a rotor disposed around the stator.

The stator of the driving motor 113 may include a ring-shaped base, teeth protruding outward in the radial direction of the stator, and coils wound around the teeth. A magnetic field may be produced by a current flowing into the coil, and the teeth may be magnetized by the magnetic field.

The rotor 113 of the driving motor 113 includes a plurality of permanent magnets disposed on the internal surface of a side wall, and the permanent magnet magnetically interacts with the coil of the stator. This enables the rotor to be rotated.

This structure of the driving motor 113 is only by way of example, and is not limited thereto.

The power converter 114 converts power of the external power source to charging power required to charge the first battery 112a, and converts the power of the first battery 112a to driving power required to drive the driving motor 113.

The power converter 114 converts the power of the external power source or the power of the first battery 112a to charging power required to charge the second battery 112b.

The power converter 114 converts the power of the first battery 112a to driving power for various devices in the vehicle 100. When there is the second battery 112b provided, the power converter 114 converts the power of the second battery 112b to driving power for the various devices in the vehicle 100.

The power converter 114 will be described in detail later.

The speed reducer 115 converts revolutions per minute (rpm) of the motor for the driving speed of the vehicle 100 to reach a target speed. The speed reducer 115 generates driving force corresponding to the converted motor rpm and delivers the driving force to the left and right vehicle wheels 111.

It is also possible for the speed reducer 115 to convert an input motor rpm into a certain rate.

The target speed may be a speed corresponding to pressure on the accelerator pedal or brake pedal, or may be a set speed input by the user.

The oil pump 116 may be an electric oil pump, including a pump motor 116a.

The oil pump 116 pumps oil to be applied for the speed reducer 115 to maintain working fluid pressure and enable lubrication and for the driving motor 113 to control the temperature of the driving motor 113.

The oil pump 116 may continue to operate from when the ignition of the vehicle 100 is turned on to when the ignition is turned off, and may be operated in the charging mode.

The vehicle 100 may further include an oil cooler 117 that receives and utilizes a coolant to drop the oil temperature.

The vehicle may include an oil path 118 to deliver the oil pumped from the oil pump 116 to the driving motor 113. The oil pumped by the oil pump 116 may run through the driving motor 113 and the speed reducer 115 through the oil path 118.

This will be explained in connection with FIG. 2.

Referring to FIG. 2, the driving motor 113 may include a housing 113a covering the stator and rotor, a first fluid path 113b disposed in the housing 113a for spraying oil, and a second fluid path 113c disposed in the housing 113a for collecting the oil sprayed into the housing 113a and draining the collected oil to the speed reducer 115. The first fluid path 113b may be located above the second fluid path 113c.

The vehicle 100 may include an oil reservoir 115a connected to the second fluid path 113c of the driving motor 113 and storing oil, and a filter 115b located between the oil reservoir 115a and the oil pump 116 to filter out impurities from the oil flowing from the oil reservoir 115a to the oil pump 116; further include a fluid path disposed between the oil reservoir 15a and the filter 15b and a fluid path disposed between the oil reservoir 115a and the oil pump 116; further include a fluid path disposed between the second fluid path 113c and the oil reservoir 115a.

The oil reservoir 115a and the filter 115b may be disposed to be adjacent to the speed reducer 115, or disposed in a housing that forms the speed reducer 115.

The driving motor 113 and the speed reducer 115 may share a cooling path for oil.

The oil pump 116 is mechanically coupled with an oil cooler 117 and pumps oil so that the oil is delivered to the driving motor 113 through the oil cooler 117.

A portion 118a of the oil path 118 in which the oil pumped from the oil pump 116 flows may be covered by the oil cooler 117.

The oil cooler 117 may include a coolant path 117a disposed to be adjacent to the portion 118a of the oil path 118 and having a coolant flowing therethrough.

The coolant flowing through the coolant path of the oil cooler 117 may be used to keep the oil flowing into the oil path at a constant temperature.

The oil cooler 117 may block the flow of coolant when the oil temperature is less than a first threshold temperature or a second threshold temperature.

The vehicle 100 may further include a first detector 121 disposed inside or close to the oil reservoir 115a for detecting the oil temperature, and/or a second detector 122 for detecting the inside temperature of the housing 113a of the driving motor 113. The second detector 122 may be disposed to be adjacent to the first fluid path 113b.

Figure 3:
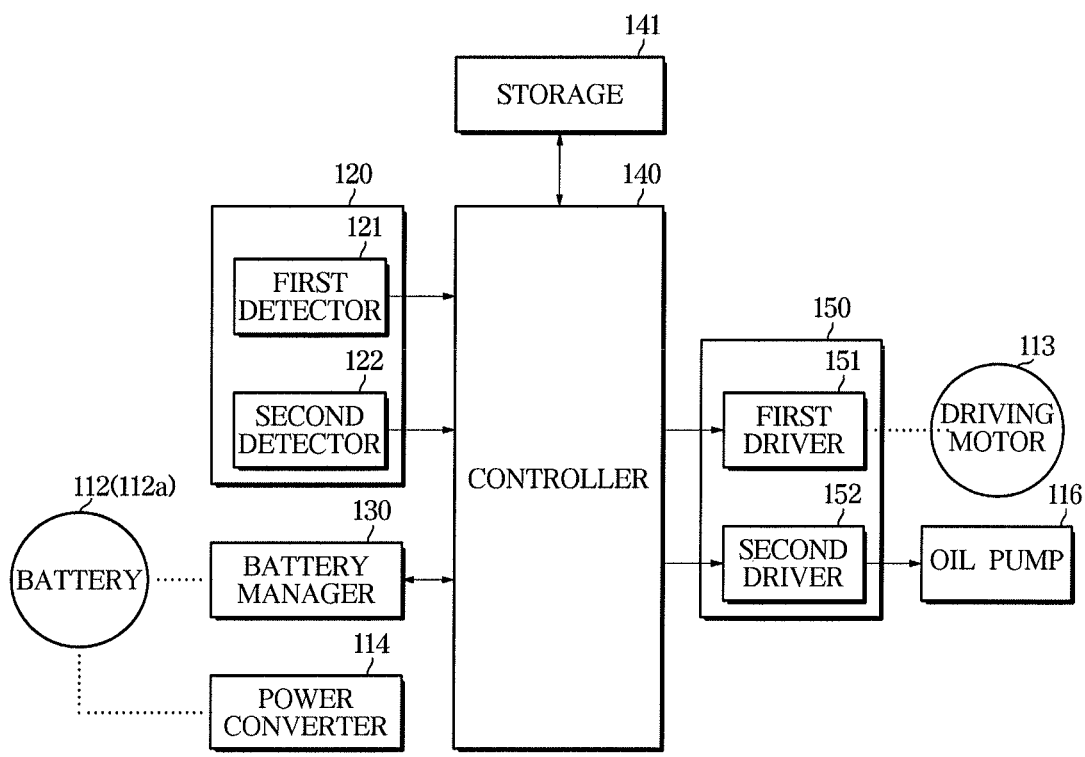
FIG. 3 is a control block diagram of a vehicle, according to an exemplary embodiment of the present invention.
Figure 4:
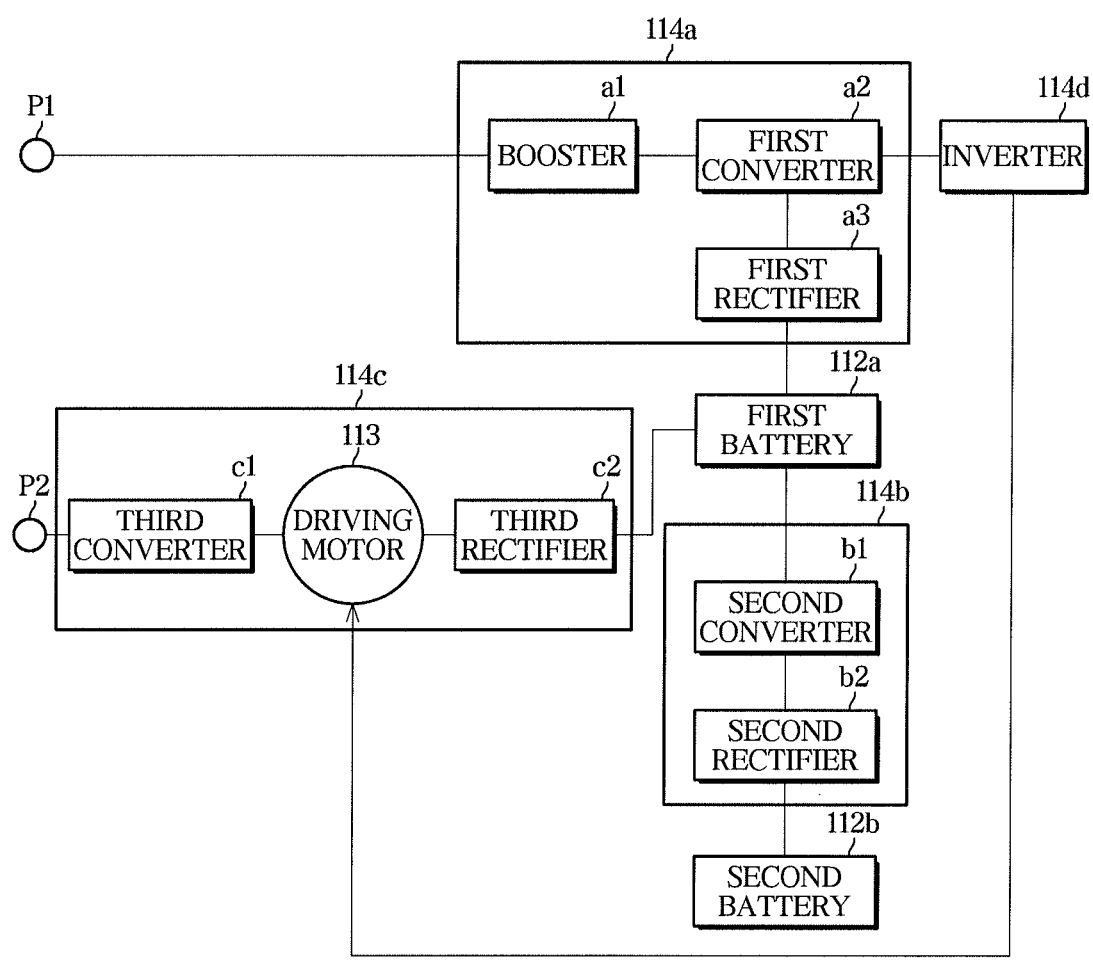
FIG. 4 is a detailed block diagram of a power converter provided in a vehicle, according to an exemplary embodiment of the present invention.

FIG. 3 is a control block diagram of a vehicle, according to an exemplary embodiment of the present invention, which will be described in connection with FIG. 4. FIG. 4 is a detailed block diagram of a power converter provided in a vehicle, according to an exemplary embodiment of the present invention.

Referring to FIG. 3, a vehicle includes the battery 112, the driving motor 113, the power converter 114, the oil pump 116, a detector 120, a battery manager 130, a controller 140, a storage 141, and a driver 150.

The detector 120 includes the first detector 121 for detecting the oil temperature and the second detector 122 for detecting the temperature of the driving motor 113, as described above.

Referring to FIG. 4, the power converter 114 may include at least one charging terminal P1, P2, a first power converter 114a, a second power converter 114b, a third power converter 114c, and an inverter 114d.

The charging terminal may be plugged with an external charger. The charging terminals may include a first charging terminal P1 for slow charging and a second charging terminal P2 for quick charging.

The first power converter 114a may include a booster a1, a first converter a2, and a first rectifier a3.

The booster a1 rectifies AC power received from an external power source, boosts the rectified DC power to a level which is suitable for charging the first battery 112a, and supplies the boosted DC power to the first battery 112a to charge the first battery 112a.

The booster a1 may boost the rectified DC power by a certain level.

The external power source may be an AC power source at a charging station, which may be a commercial power source.

The booster a1 may include a bridge diode, at least one switching element, and an inductor.

A boosting principle of the booster a1 will now be described briefly.

During ON period of the switching element of the booster a1, a current of the input AC power is converted into DC power by the bridge diode; a current of the DC power flows into the inductor so that the inductor stores energy. For example, the inductor stores the energy in a form of magnetic field.

During OFF period of the switching element of the booster a1, the energy stored in the inductor is released. The released energy turns out to be electromotive force having opposite polarity to the current flowing into the ON period of the switching element.

In other words, the electromotive force is produced in such a direction that maintains the current having flowed in the ON period of the switching element. A voltage produced at the present time is called counter electromotive force, and the counter electromotive force enables the boosting of voltage. The boosted voltage is rectified by a diode and then applied to the first battery 112a. In the present way, the first battery 112a may be charged.

The first power converter 114a may further include a noise elimination filter disposed between the external AC power source and the booster a1 for eliminating noise between the external AC power source and the first battery 112a.

The first converter a2 may include a full-bridge circuit and a transformer. The full-bridge circuit may have a plurality of switching elements.

The first converter a2 converts the boosted DC power into high frequency AC power through the full-bridge circuit, and transforms the high frequency AC voltage to a higher-level voltage through the transformer. The first converter a2 may use the transformer to physically isolate the first battery 112a from the external power source.

The first rectifier a3 may include a diode.

It is also possible for the first rectifier a3 to include a full-bridge circuit and an LC filter. The full-bridge circuit may have a plurality of switching elements.

The first rectifier a3 utilizes the full-bridge circuit to rectify the high voltage AC power and utilizes the LC filter to convert the rectified voltage to a DC voltage. The DC voltage is used to charge the first battery 112a.

The second power converter 114b may include a second converter b1 and a second rectifier b2.

The second converter b1 converts the DC power of the first battery 112a to DC power which is suitable for charging the second battery 112b, and supplies the converted DC power to the second battery 112b to charge the second battery 112b.

The second battery 112b charged with the power converted by the second converter b1 may supply driving power to an electronic device provided in the vehicle 100, such as a lamp.

The second converter b1 may include at least one switching element and an inductor.

It is also possible for the second converter b1 to have a full-bridge circuit and a transformer. The full-bridge circuit may have a plurality of switching elements.

In the instant case, the second converter b1 converts the DC voltage of the first battery 112a to a high frequency AC voltage through the full-bridge circuit, and transforms the high frequency AC voltage to a low voltage. The transformer of the second converter b1 may isolate the second battery 112b from the first battery 112a.

The second rectifier b2 may include at least one diode and an LC filter.

The second rectifier b2 rectifies AC power and utilizes the LC filter to smoothen the rectified power. The smoothened DC voltage may be used to charge the second battery 112b.

If the output voltages of the first and second batteries 112a and 112b are the same, the second converter 114d may be omitted.

Otherwise, if the output voltages of the first and second batteries 112a and 112b are different, the power output from the first battery 112a may be converted to power which is suitable for charging the second battery 112b by controlling pulse width modulation of the switching element in the first converter a2.

The third power converter 114c may include a third converter c1 and a third rectifier c2, and use the coil of the driving motor 113 as a transformer.

The third converter c1 rectifies input power from the external power source, improves the power-factor (PF), and suppresses harmonic currents. Furthermore, the third converter c1 converts the rectified and power-factor-improved power to a high frequency AC voltage. The third converter c1 may be omitted in various exemplary embodiments.

The driving motor 113 is configured as a transformer when AC power is supplied from an external power source through the second charging terminal P2, to transform the voltage of the applied AC power. For example, the motor 113 transforms the voltage of the input AC power to a high voltage. In the instant case, a voltage and current may be applied to the coil of the stator and the rotor may be kept in a stopped state, i.e., non-operated state.

The third rectifier c2 may include a diode and a capacitor.

It is also possible for the third rectifier c2 to include a full-bridge circuit and an LC filter. The rectifier c2 may use the full-bridge circuit to rectify the transformed high voltage AC power, and converts the rectified power to a DC voltage using the LC filter. The DC voltage may be used to charge the first battery 112a.

The driving motor 113 may be used as a transformer to convert the commercial AC power to a voltage for rapidly charge the first battery 112a.

Such a configuration of the power converter 114 is only by way of example, and the power converter 114 may be implemented in other various configurations.

The inverter 114d converts the DC voltage to a three-phase AC voltage in a response to receiving a charging voltage from the first battery 112a, and applies the three phase AC voltage to the driving motor 113.

The inverter 114d outputs the driving power for the driving motor 113 based on a target driving speed instructed by the user. The driving power for the driving motor 113 may be a switching signal to output a current corresponding to the target speed and a switching signal to output a voltage corresponding to the target driving speed.

The inverter 114d may include a plurality of switching elements, and further include diodes connected to the plurality of switching elements.

The inverter 114d may transmit regenerative energy of the driving motor 113 to the first battery 112a during regenerative braking of the vehicle, to charge the first battery 112a.

In an exemplary embodiment of the present invention, the power converter 114 may include the third power converter 114c and the inverter 114d; in another exemplary embodiment of the present invention, the power converter 114 may include the first power converter 114a, the third power converter 114c, and the inverter 114d; in yet another exemplary embodiment of the present invention, the power converter may include the second power converter 114*b*, the third power converter 114*c*, and the inverter 114*d*.

The battery manager 130 may estimate a state of charge (SOC) value of the first and/or second battery 112*a*, 112*b* while monitoring state of the battery cells of the first and/or second battery 112*a*, 112*b*, and keep cell voltages constant to prevent overcharging/overdischarging while managing charging/discharging of the first and/or second battery 112*a*, 112*b*.

The battery manager 130 may monitor an SOC value of the first and/or second battery 112*a*, 112*b*, send the SoC information related to the monitored SoC to the controller 140, determine a charge level corresponding to the SOC value of the first and/or second battery 112*a*, 112*b*, and generate a trigger signal if the charge level corresponds to a reference level.

The battery manager 130 may include a charging detector for detecting an SOC value of the first and/or second battery 112*a*, 112*b*. In the exemplary embodiment of the present invention, a configuration of monitoring the first battery 112*a* will be described.

The battery manager 130 utilizes the charging detector configured to detect a current, a voltage, and temperature of the first battery 112*a*, determines an SOC value of the first battery 112*a* based on the detected current, voltage, and temperature, and manages the first battery 112*a* to be charged or discharged based on the SOC value of the first battery 112*a*.

The charging detector may further include a current detector for detecting the current of the first battery 112*a*, a voltage detector for detecting the voltage of the first battery 112*a*, and a temperature detector for detecting the temperature of the first battery 112*a*.

The battery manager 130 monitors the SOC value of the first battery 112*a* based on the detected current of the first battery 112*a*.

It is also possible for the battery manager 130 to monitor the SOC value of the first battery 112*a* based on the detected current and voltage of the first battery 112*a*.

Alternatively, the battery manager 130 may monitor the SOC value of the first battery 112*a* based on the current, voltage, and temperature of each cell of the first battery 112*a*.

The battery manger 130 may output information related to the monitored SOC value of the first battery 112*a* to the controller 140.

The SOC value of the first battery 112*a* may include an amount of charge of the first battery 112*a*.

The vehicle may further include an input device for receiving an input from the user, a display device for displaying operation information related to the vehicle.

The input device may receive one of slow charging mode and quick charging mode.

The display device may display a notification that charging is required, and/or display the SOC value of the first battery 112*a*.

The display device may display the charging mode, and/or display information related to whether the charging mode is the slow charging mode or the quick charging mode.

The controller 140 may receive the information related to the SOC value of the first battery 112*a* from the battery manager 130, determine whether the first battery 112*a* needs to be charged based on the information related to the SoC, and if it is determined that the first battery 112*a* needs to be charged, control the display to display a notification that charging is required or control a speaker to output a sound of the notification that charging is required.

In another exemplary embodiment of the present invention, upon receiving a trigger signal from the battery manger 130, the controller 140 may control the display to output the notification that charging is required.

The controller 140 determines an operation mode of the vehicle based on ignition ON or OFF information, driving speed information, brake pedal pressure information, accelerator pedal pressure information, and an access signal of the charging terminal. For example, the controller 140 may determine whether the vehicle is operated in a driving mode, a stopped mode, a regenerative braking mode, or a charging mode.

When the vehicle is in the driving mode, the controller 140 acquires required power of the user based on at least one of the current driving speed of the vehicle, the pressure applied on the accelerator pedal, and the pressure applied on the brake pedal, obtains target driving speed corresponding to the required power of the user, and controls operation of the driving motor 113 based on the target driving speed.

Accordingly, the vehicle is driven with the power generated by the driving motor 113.

Upon receiving information related to the brake pedal pressure, the controller 140 acquires braking power required by the driver based on speed and frequency at which the brake pedal is pushed, controls deceleration and stop based on the acquired braking power required by the driver, and further controls performing the regenerative braking mode based on the braking power.

The speed at which the brake pedal is pushed may be acquired according to a time of detection of the pressure and a change in pressure when the brake pedal is pushed.

The controller 140 may control the driving motor 113 to operate as a generator to perform regenerative braking when the vehicle is operated in the regenerative braking mode. When the brake pedal is pushed, the controller 140 controls the driving motor 113 to operate as a generator by controlling the operation of the driving motor 113 such that the force acting on the driving motor 113 may work in the counter direction thereof.

The controller 140 may limit charging in the regenerative braking mode based on an amount of charge of the first battery 112*a*.

Upon receiving an access signal when one of the slow charging terminal and the quick charging terminal is plugged in, the controller 140 recognizes that the vehicle is operated in the charging mode.

When receiving an access signal of the slow charging terminal, the controller 140 recognizes that the vehicle is operated in the slow charging mode, and when receiving an access signal of the quick charging terminal, the controller 140 recognizes that the vehicle is operated in the quick charging mode.

Furthermore, it is possible for the controller 140 to recognize that the vehicle is operated in the charging mode when receiving a charging mode input signal through the input device.

When receiving an input signal of the slow charging mode through the input device, the controller 140 recognizes that the vehicle is operated in the slow charging mode, and when receiving an input signal of the quick charging mode through the input device, the controller 140 recognizes that the vehicle is operated in the quick charging mode.

If the vehicle is operated in the quick charging mode, the controller 140 controls input power to be applied to the coil of the driving motor 113.

The vehicle may include a first switch connecting the driving motor 113 and the inverter 114d, and a second switch connecting the driving motor 113 and the third power converter 114c.

If the vehicle is in the driving mode or regenerative braking mode, the controller 140 may control the first switch for the driving motor 113 and the inverter 114d to be electrically and mechanically connected to each other, so that the power converted by the inverter 114d is applied to the coil of the driving motor 113.

If the vehicle is in the quick charging mode, the controller 140 may control the second switch for the driving motor 113 and the third power converter 114c to be electrically and mechanically connected to each other, so that the power converted by the third power converter 114c is applied to the coil of the driving motor 113. The present enables the coil of the driving motor 113 to serve as a transformer.

When the oil temperature detected by the first detector 121 is received, the controller 140 determines whether the oil temperature is less than the first threshold temperature, and if the oil temperature is determined to be less than the first threshold temperature, determines whether the vehicle is operated in the charging mode.

The first threshold temperature may be about 35 degrees below zero, without being limited thereto, and may be different depending on the oil type. For example, it may be a temperature obtained by an experiment for each oil type.

The determination of the controller 140 may include determining whether the charging mode is the quick charging mode. This is because the driving motor 113 is heated in the quick charging mode.

If determining that the vehicle is operated in the charging mode, the controller 140 performs a warm-up mode by applying a certain reference voltage to the pump motor 116a of the oil pump 116.

The controller 140 allows the oil in the oil reservoir 115a to flow to the driving motor 113 through the oil path 118 by controlling the pump motor 116a of the oil pump 116 to be slowly rotated during the warm-up mode.

The controller 140 determines whether the oil temperature detected by the first detector 121 is higher than a second threshold temperature during the warm-up mode, and if determining that the oil temperature is higher than the second threshold temperature, stops the warm-up mode and performs a normal mode.

In the normal mode, the controller 140 checks the temperature of the driving motor 113 detected by the second detector 122 and controls rotation speed of the pump motor 116a of the oil pump 116 based on the temperature of the driving motor 113 checked, so that the oil pumped by the oil pump 116 may be supplied to the speed reducer 115 and to the driving motor 113.

The oil supplied to the driving motor 113 may help the driving motor 113 stay at a constant temperature. This may prevent the driving motor 113 from being overheated.

The controller 140 may also control the rotation speed of the pump motor 116a of the oil pump 116 based on the temperature of the driving motor 113 and the oil temperature. The temperature of the driving motor 113 may be a temperature inside the housing 113a of the driving motor 113.

The controller 140 may drop the oil temperature by controlling operation of the oil cooler 117 if the temperature of the driving motor 113 is higher than a certain temperature. The oil with the dropped temperature may be supplied to the driving motor 113 and may lower the temperature of the driving motor 113.

The oil cooler 117 may further include a fan for allowing heat exchange between the oil flowing into the oil path and the coolant flowing into the coolant path, and a valve for blocking the flow of the coolant.

In controlling operation of the oil cooler 117, the controller 140 may control opening of the valve for the coolant to run through the coolant path and control the fan to allow heat-exchange between the coolant and the oil.

That is, the controller 140 may perform cooling of the driving motor 113 and cooling and lubrication of the speed reducer 115.

The controller 140 may also control rotation times of the oil pump 116 based on an amount of the oil required for cooling the driving motor 113 in the normal mode.

The controller 140 may also control rotation speed of the oil pump 116 based on an amount of the oil required for lubrication of the speed reducer 115 in the normal mode.

The controller 140 may detect an actual rotation speed of the driving motor 113.

The controller 140 may receive the feedback of the detected actual rotation speed to control the rotation speed of the driving motor based on the actual rotation speed and the target driving speed.

In controlling the normal mode of the oil pump 116, the controller 140 may detect an actual rotation speed of the pump motor 116a. The controller 140 may receive the feedback of the detected actual rotation speed to control the rotation speed of the pump motor 116a based on the actual rotation speed and the target rotation speed.

The vehicle may further include a first speed detector for detecting actual rotation speed of the driving motor 113 and a second speed detector for detecting actual rotation speed of the pump motor 116a.

The controller 140 may be implemented with a memory storing an algorithm to control operation of the components in the vehicle 100 or data about a program that implements the algorithm, and a processor carrying out the aforementioned operation using the data stored in the memory. The memory and the processor may be implemented in separate chips. Alternatively, the memory and the processor may be implemented in a single chip.

The controllers 140 may be an electronic control unit (ECU) for controlling driving of the vehicle, or one of a micro controller, a central processing unit (CPU), and a processor.

The controller 140 may include a motor control unit (MCU) for controlling operation of the inverter 114d to rotate the driving motor 113 and perform regenerative braking at the time of braking or deceleration, and a pump control unit (PCU) for controlling driving of the pump motor 116a provided in the oil pump 116.

The MCU and PCU may be implemented separately or in an integrated single chip.

The storage 141 stores a first threshold temperature for the oil pump 116 to be operated in the warm-up mode, and a second threshold temperature for the oil pump 116 to be operated in the normal mode. The first threshold temperature may be lower than the second threshold temperature.

The storage 141 may also store a certain temperature used to control the temperature of the driving motor 113 to be constant.

The storage 141 may also store a reference voltage to be applied to the pump motor 116a in the warm-up mode.

The storage 141 may store rotation speeds of the oil pump 116 that correspond to the temperature of the driving motor and the oil temperature. The rotation speeds of the oil pump 116 that correspond to the temperature of the driving motor and the oil temperature may be stored in a look-up table.

The storage 141 may be a memory implemented with a chip separate from a processor in relation to the controller 160, or may be implemented with the processor in a single chip.

The storage 141 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto.

The driver 150 may include a first driver 151 for driving the driving motor 113 at a rotation speed corresponding to a control instruction of the controller 140, and a second driver 152 for driving the oil pump 116 to correspond to a control instruction of the controller 140.

The first driver 151 may correspond to the inverter 114d comprised of a plurality of switches.

The first driver 151 stops operation of the driving motor 113 in the charging mode.

The second driver 152 supplies reference power to the oil pump 116 in the warm-up mode, and supplies driving power to the oil pump 116 to correspond to the rotation speed of the pump motor 116a in the normal mode.

The second driver 152 regulates the power applied to the pump motor 116a by performing pulse width modulation on at least one of the input current and the input voltage based on the rotation speed of the pump motor 116a.

The first battery 112a is charged using the power converted by the first power converter 114a or third power converter 114c in the charging mode, and charged using the power applied through the driving motor 113 and the inverter 114d in the regenerative braking mode.

In the driving mode, the first battery 112a supplies driving power to drive the driving motor 113 through the inverter 114d.

The second battery 112b is charged using the power converted by the second power converter 114b. The second battery 112b supplies driving power to drive the various devices provided in the vehicle.

The driving motor 113 is rotated while controlling the rotation speed based on a control instruction of the controller 140 and transmits the turning force to the vehicle wheels 111 through the speed reducer 115.

The driving motor 113 performs the regenerative braking mode at the time of deceleration, stop, and braking. In the regenerative braking mode, power application is blocked and the current is applied in the reverse direction thereof, producing torque in the reverse direction thereof. At the instant time, the driving motor 113 is rotated in the same direction as the direction before the time of braking due to the inertial force.

In the charging mode, a voltage is applied to the driving motor 113 through at least one coil of the stator, and the driving motor 113 transforms the voltage through at least another coil and outputs the transformed voltage. This makes the driving motor 113 heated in the charging mode.

The driving motor 113 may serve as a transformer when power is applied from an external power source through the second charging terminal P2 or the quick charging mode is selected through the input device.

When the vehicle is operated in the charging mode, the oil pump 116 drives the pump motor 116a with predetermined reference power to perform the warm-up mode.

The oil pump 116 may receive the driving power from the first battery 112a or the second battery 112b. The driving power applied from the first battery 112a or the second battery 112b may be regulated in magnitude by the second driver, and may correspond to the reference power in the warm-up mode and the power corresponding to the rotation speed in the normal mode.

During the warm-up mode, the oil stored in the oil reservoir 115a flows to the driving motor 113 through the oil path 118 as the pump motor 116a of the oil pump 116 is driven. The oil flowing into the driving motor 113 is sprayed and then flows to the oil reservoir 115a.

The rotation speed of the pump motor 116a may vary by difference between the discharging voltage at a discharging port of the oil pump 116 and the spraying pressure from the first fluid path 113b.

During the normal mode, the oil pump 116 pumps oil by rotating the pump motor 116a at rotation speed corresponding to a control instruction of the controller 140, and sends the pumped oil to the speed reducer 115 and to the driving motor 113 through the oil path 118.

Figure 5:
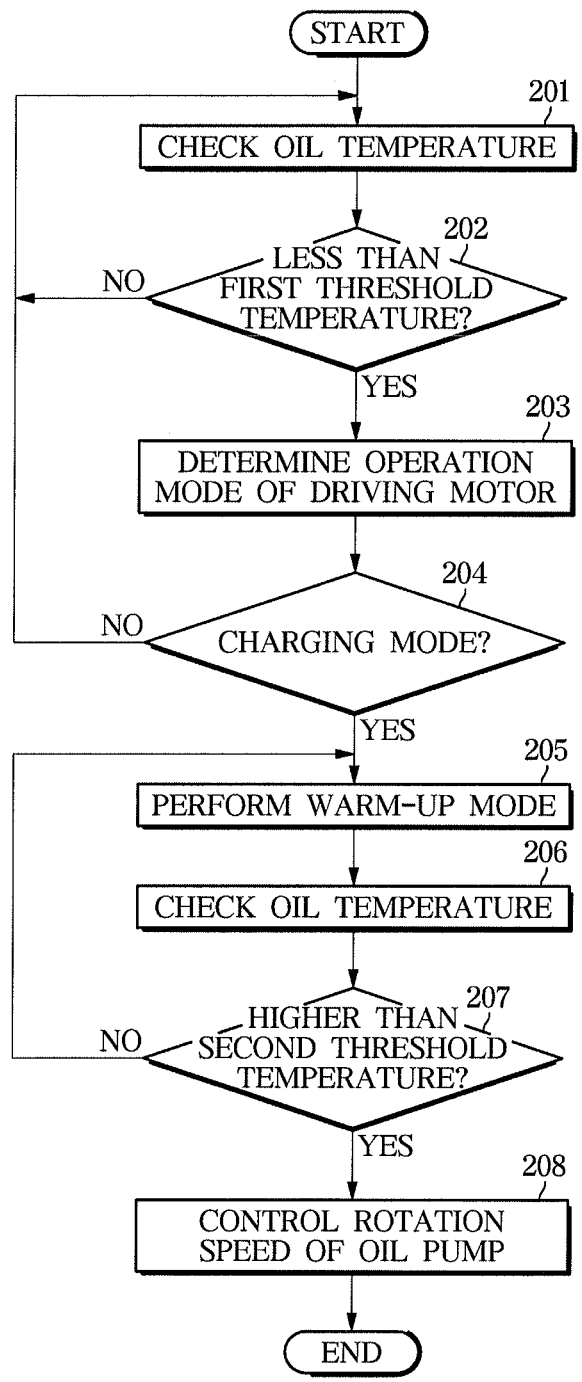
FIG. 5 is a flowchart illustrating a method for controlling a vehicle, according to an exemplary embodiment of the present invention.

FIG. 5 is a flowchart illustrating a method for controlling a vehicle, according to an exemplary embodiment of the present invention.

A vehicle checks the oil temperature in the oil reservoir 115a detected by the first detector 121, in 201.

The vehicle compares the checked oil temperature and the first threshold temperature to determine whether the oil temperature is lower than the first threshold temperature, in 202, and if the oil temperature is determined to be lower than the first threshold temperature, checks an operation mode of the vehicle, in 203.

The vehicle determines whether the operation mode checked is a charging mode in 204, and if the operation mode is determined to be the charging mode, performs the warm-up mode in 205.

Determining whether the operation mode checked is the charging mode may include determining whether an access signal of a charging terminal is received.

Furthermore, determining whether an access signal of a charging terminal is received may include determining whether an access signal of the quick charging terminal is received.

Moreover, determining whether the operation mode checked is the charging mode may include determining whether an input signal of a charging mode is received through the input device.

Furthermore, determining whether an input signal of a charging mode is received may include determining whether an input signal of the quick charging mode is received through the input device.

The vehicle determines whether the charging mode is performed using the driving motor 113.

At the instant time, the quick charging terminal of the vehicle is plugged with an external power source, and the driving motor 113 is electrically and mechanically connected to the third converter c1 and third rectifier c2 of the third power converter 114c of the power converter 114.

This allows the power of the external power source to be applied to the driving motor 113 through the third converter c1 and the power transformed at the driving motor 113 to be rectified by the third rectifier c2 and applied to the first battery 112a, charging the first battery 112a.

Performing the warm-up mode includes applying predetermined reference power to the pump motor 116a of the oil pump 116. The reference power may have a reference voltage and a reference current, and may be the power that allows the pump motor 116a to be continuously rotated at less than reference speed. The reference speed may be obtained by an experiment.

Allowing the pump motor 116a of the oil pump 116 to be slowly rotated may make the oil in the oil reservoir 115a flow to the driving motor 113 through the oil path 118.

Allowing the pump motor 116a of the oil pump 116 to be slowly rotated may include allowing the pump motor 116a of the oil pump 116 to be rotated at less than the reference speed.

The oil flowing into the first fluid path 113b in the housing 113a of the driving motor 113 during the warm-up mode is sprayed to the driving motor 113 inside the housing 113a. The oil sprayed to the driving motor 113 exchanges heat with the driving motor 113, and then rises in temperature.

The oil sprayed and heat-exchanged in the housing 113a of the driving motor 113 is gathered in the second fluid path 113c, and the oil in the second fluid path 113c flows to the oil reservoir 115a.

The oil flowing to the oil reservoir 115a of the speed reducer 115 via the driving motor 113 is mixed with the oil stored in the oil reservoir 115a and raises the temperature of the oil in the oil reservoir 115a.

In the present way, the vehicle may perform the warm-up mode for the oil pump 116 to raise the oil temperature and accordingly, reduce the oil viscosity. With the reduced oil viscosity, there is no need to apply a big starting torque to the pump motor 116a.

The vehicle allows the pump motor 116a to be just rotated at less than the reference speed without performing rotation speed control on the pump motor 116a of the oil pump 116 during the warm-up mode, allowing the oil to flow through the oil reservoir 115a, oil path 118, and driving motor 113.

Furthermore, the vehicle may drop the temperature of the driving motor 113 which is configured as a transformer during the warm-up mode, which leads to preventing a failure of the driving motor 113 due to overheat of the driving motor 113 and reducing the drag of the speed reducer 115 at the start of driving of the vehicle.

While performing the warm-up mode, the vehicle periodically checks the temperature of the oil detected by the first detector 121 in 206, compares the checked oil temperature with the second threshold temperature to determine whether the oil temperature is higher than the second threshold temperature in 207, and if the oil temperature is determined to be higher than the second threshold temperature, stops the warm-up mode and operates the oil pump 116 in the normal mode.

Operating the oil pump 116 in the normal mode includes controlling the rotation speed of the pump motor 116a of the oil pump 116, in 208.

During the normal mode, the vehicle checks the temperature of the oil detected by the first detector 121, checks the temperature of the driving motor 113 detected by the second detector 122, and controls the rotation speed of the pump motor 116a of the oil pump 116 based on the temperature of the driving motor 113 and oil temperature checked.

Controlling the rotation speed of the pump motor 116a of the oil pump 116 may include performing pulse width modulation on the current or voltage applied to the pump motor 116a.

The higher the temperature of the driving motor 113 and the oil temperature, the higher the rotation speed of the pump motor 116a of the oil pump 116.

During the normal mode, the vehicle supplies the oil pumped by the oil pump 116 to the speed reducer 115 and to the driving motor 113.

If it is determined that the temperature of the driving motor 113 is higher than a certain temperature, the vehicle may use the oil cooler 117 to drop the temperature of the pumped oil and allow the oil that went through the drop in temperature to be supplied to the driving motor 113, preventing the driving motor 113 from being overheated.

Using the oil cooler 117 to drop the temperature of the pumped oil includes dropping the temperature of the pumped oil by having a coolant flow into the oil cooler 117 and allowing heat exchange to occur between the coolant flowing into and the oil.

Depending on the oil temperature, the temperature of the coolant flowing into the coolant path may be different and/or the flow rate of the coolant may be different.

Meanwhile, the exemplary embodiments of the present invention may be implemented in a form of recording media for storing instructions to be conducted by a computer. The instructions may be stored in a form of program codes, and when executed by a processor, may generate program modules to perform operation in the exemplary embodiments of the present invention. The recording media may correspond to computer-readable recording media.

The computer-readable recording medium includes any type of recording medium having data stored thereon which may be thereafter read by a computer. For example, it may be a ROM, a RAM, a magnetic tape, a magnetic disk, a flash memory, an optical data storage device, etc.

According to an exemplary embodiment of the present invention, when the oil temperature of an oil pump is below a threshold temperature and the vehicle is operating in a charging state, the oil pump may be operated in a warm-up mode to reduce the oil viscosity and hence reduce the drag of a speed reducer when the vehicle is driven after being charged.

Overheating of a driving motor may be prevented by running the oil via the driving motor while the oil pump is in the warm-up mode, and the oil temperature in the oil pump may rise and the oil viscosity may be lowered by running the oil that has passed the driving motor back into the oil pump.

This may prevent a rise in torque of a motor in the oil pump and avoid a rise in volume of the motor and a rise in expenses of the oil pump.

Accordingly, according to an exemplary embodiment of the present invention, the quality and commercial value of an eco-friendly vehicle may be improved, which leads to an increase of user satisfaction and improvement of reliability and safety of the vehicle, securing competitiveness of the product.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodi-

What is claimed is:

1. A vehicle comprising:
a driving motor connected to a vehicle wheel and configured to supply driving force to the vehicle wheel;
a power converter connected to an external power source and the driving motor and configured to use a coil provided in the driving motor to transform power input from the external power source;
a battery connected to the power converter and configured to be charged according to counter electromotive force of the driving motor in a regenerative braking mode, charged according to the power transformed by the power converter in a charging mode, and supply driving power to the driving motor in a driving mode;
an oil pump configured to supply oil to the driving motor;
a detector configured to detect oil temperature of the oil; and
a controller connected to the oil pump and configured to control the oil pump to be operated in a warm-up mode when the oil temperature detected by the detector is less than a first threshold temperature and the battery is in the charging mode, and apply reference power to the oil pump to move the oil to the driving motor in the warm-up mode,
wherein the warm-up mode is a mode in which an oil viscosity of the oil is reduced by increasing the oil temperature of the oil in the oil pump,
wherein the oil pump includes a pump motor configured to pump oil stored in an oil reservoir,
wherein the reference power is power for the pump motor to be rotated at less than a reference speed,
wherein the controller is configured to switch operation of the oil pump to be in a normal mode when the oil temperature detected in the warm-up mode is higher than a second threshold temperature, and in the normal mode, control rotation speed of the pump motor, and
wherein the first threshold temperature is lower than the second threshold temperature.

2. The vehicle of claim 1,
wherein the detector is further configured to detect temperature of the driving motor, and
wherein the controller is configured to control the rotation speed of the motor configured for pump based on the detected temperature of the driving motor and the detected oil temperature.

3. The vehicle of claim 1, further including:
a speed reducer mounted and coupled between the vehicle wheel and the driving motor,
wherein the oil pump is configured to pump the oil stored in the oil reservoir to supply the oil to the speed reducer in the normal mode.

4. The vehicle of claim 1, further including:
an oil path mounted between the driving motor and the oil pump; and
an oil cooler accommodating a portion of the oil path and a coolant path in which a coolant flows,
wherein the controller connected to the oil cooler is configured to control operation of the oil cooler such that the coolant flows into the coolant path when temperature of the driving motor is higher than a predetermined temperature.

5. The vehicle of claim 4, further including:
a housing accommodating the driving motor;
a first fluid path mounted in the housing, connected to the oil path and configured to spray oil that flows into through the oil path; and
a second fluid path configured to collect the sprayed oil and release the collected oil to the oil reservoir.

6. The vehicle of claim 1, further including:
a first driver connected to the controller and the driving motor and configured to output driving power corresponding to a target driving speed to the driving motor in the driving mode; and
a second driver connected to the controller and the oil pump and configured to output driving power corresponding to the rotation speed of the oil pump to the oil pump in a normal mode of the oil pump.

7. The vehicle of claim 1, further including:
a booster configured to boost Alternate Current (AC) power input from the external power source to a predetermined extent;
a first converter connected to the booster and configured to convert the boosted power to power required for charging the battery; and
a first rectifier connected to the first converter and configured to rectify the power converted by the first converter and apply the rectified power to the battery.

8. The vehicle of claim 7, further including:
an auxiliary battery;
a second converter connected to the battery and configured to convert power of the battery to power required for charging the auxiliary battery; and
a second rectifier connected to the second converter and configured to rectify the power converted by the second converter and apply the rectified power to the auxiliary battery.

9. The vehicle of claim 7, further including:
a third converter configured to rectify the AC power input from the external power source, convert the rectified AC power to a high frequency AC voltage, and apply the high frequency AC voltage to the coil of the driving motor; and
a third rectifier connected to the coil of the driving motor and configured to rectify power transformed by the coil of the driving motor and apply the rectified power to the battery.

10. A method for controlling a vehicle having a driving motor configured to apply driving force to a vehicle wheel and a battery configured to supply power to the driving motor, the method comprising:
detecting oil temperature of oil stored in an oil reservoir;
determining, by a controller, when the vehicle is operated in a charging mode when the detected oil temperature is lower than a first threshold temperature;
operating, by the controller, an oil pump in a warm-up mode when the vehicle is operated in the charging mode;
checking, by the controller, temperature of the oil during the warm-up mode of the oil pump; and
operating, by the controller, the oil pump in a normal mode when the checked oil temperature is higher than a second threshold temperature,
wherein the operating of the oil pump in the warm-up mode includes applying reference power to the oil pump such that the oil is moved to the driving motor,
wherein the first threshold temperature is lower than the second threshold temperature,
wherein the warm-up mode is a mode in which an oil viscosity of the oil is reduced by increasing oil temperature of oil in the oil pump, and wherein the normal mode is a mode for supplying oil to the driving motor so that a temperature of the driving motor is maintained at a constant temperature and prevents the driving motor from overheating, wherein determination of when the vehicle is operated in the charging mode includes:

using a coil provided in the driving motor to transform power input from an external power source; and determining when the transformed power is applied to the battery.

11. The method of claim 10, wherein the operating of the oil pump in the warm-up mode includes:

rotating a pump motor provided in the oil pump at less than a threshold speed.

12. The method of claim 10, wherein the operating of the oil pump in the normal mode includes:

controlling rotation speed of a pump motor provided in the oil pump.

13. The method of claim 12, wherein controlling of the rotation speed of the pump motor includes:

detecting the temperature of the driving motor; and controlling the rotation speed of the pump motor based on the detected temperature of the driving motor and the detected oil temperature.

14. The method of claim 13, wherein the operating of the oil pump in the normal mode includes:

pumping the oil stored in the oil reservoir by controlling the rotation speed of the pump motor; and supplying the pumped oil to a speed reducer and the driving motor.

15. The method of claim 13, wherein the operating of the oil pump in the normal mode includes:

controlling operation of an oil cooler such that a coolant flows into a coolant path when the detected temperature of the driving motor is higher than a predetermined temperature.

16. The method of claim 12, wherein the operating of the oil pump in the normal mode includes:

regulating driving power applied to the pump motor to control the rotation speed of the pump motor based on actual rotation speed and target rotation speed of the oil pump.

17. The method of claim 10, further including:

regulating driving power applied to the driving motor to control rotation speed of the driving motor based on target driving speed and actual driving speed, when the vehicle is operated in a driving mode.

* * * * *